(12) United States Patent
Verego et al.

(10) Patent No.: US 7,577,953 B1
(45) Date of Patent: Aug. 18, 2009

(54) CONFIGURABLE BUSINESS PROCESS

(75) Inventors: Greg Verego, Charlotte, NC (US);
Maxine Campbell, Charlotte, NC (US);
Paul Lockyer, El Dorado Hills, CA (US); Michael Axford, El Dorado Hills, CA (US); Tom Berrisford, Charlotte, NC (US); Sandy Boyd, Charlotte, NC (US); Shanthi Iyer, El Dorado Hills, CA (US); Kevin Edwards, Charlotte, NC (US)

(73) Assignee: DST Innovis, Inc., El Dorado Hills, CA (US)

( * ) Notice: Subject to any disclaimer, the term of this patent is extended or adjusted under 35 U.S.C. 154(b) by 870 days.

(21) Appl. No.: 10/944,284

(22) Filed: Sep. 16, 2004

(51) Int. Cl.
*G06F 9/46* (2006.01)
(52) U.S. Cl. .................. 718/100; 718/102; 719/328; 715/700
(58) Field of Classification Search ............... 717/105, 717/147; 705/7; 718/100, 102; 719/328; 715/700
See application file for complete search history.

(56) References Cited

U.S. PATENT DOCUMENTS

| | | | |
|---|---|---|---|
| 2004/0111304 A1* | 6/2004 | Meka et al. | 705/7 |
| 2004/0133876 A1* | 7/2004 | Sproule | 717/105 |
| 2007/0271554 A1* | 11/2007 | Fletcher et al. | 717/147 |

* cited by examiner

*Primary Examiner*—Andy Ho
(74) *Attorney, Agent, or Firm*—Brinks Hofer Gilson & Lione

(57) ABSTRACT

A configurable business process adapted to be created from a user interface includes defining flow tasks that identify value objects and obtaining the value objects used by the flow tasks. The value objects are evaluated using evaluation rules to produce a result. The result is used, in turn, to generate instructions to a system user relating to the value objects. The configurable business process operates through a business flow engine accessible to the system user through the user interface. A business flow configuration file and an adapter configuration file are defined. The adapter configuration file maps components, methods, arguments, and return values using an XML engine. Component APIs and an evaluation rules database are provided. The business flow configuration file defines selected component APIs to be executed to perform a user-defined operation.

21 Claims, 6 Drawing Sheets

CONFIGURABLE BUSINESS PROCESS

REFERENCE TO RELATED APPLICATIONS

Related subject matter is disclosed in co-pending, commonly assigned patent applications entitled: "POLICY GROUP RULES ENGINE" assigned U.S. patent application Ser. No. 10/856,537; "POLICY CONFIGURATION USER INTERFACE" assigned U.S. patent application Ser. No. 10/856,538; "POLICY GROUP RULES ENGINE DATA MODEL" assigned U.S. patent application Ser. No. 10/856,384, all filed May 28, 2004, and "METHOD FOR GENERATING A PROFILE AND EVALUATING THE PROFILE USING DYNAMIC RULES" assigned U.S. patent application Ser. No. 10/944,015 filed on Sep. 16, 2004, the disclosures of which are incorporated by reference herein.

TECHNICAL FIELD

The present invention relates, generally, to business enterprise applications and, more particularly, to methods for configuring a business process by a system user in real time to adapt the enterprise system to the needs of the system user.

BACKGROUND

Driven by strong market demand, the technologies supporting automated data processing of customer data have matured rapidly and become quite powerful in a relatively short time period. As a result, processing system hardware is now powerful enough and fast enough to execute complex calculations on large volumes of customer data for a multitude of purposes. The rapid advances in processing system hardware, however, tend to outpace corresponding advances in software.

As one example, past approaches to processing customer data (e.g., preparing invoices) generally relied upon inflexible hard-coded processing steps. While the software might have captured the desired processing steps at the time the software was written, its hard-coded nature made the software inflexible, and in some cases, unsuitable for the software owner at a later date. With such software, the software owner could only initiate changes, if at all, through an expensive, time consuming re-programming process that required a software vendor programmer to modify the software by hand to suit customer specifications.

Even when a software owner was willing to incur the expense and delay, the modified software still had drawbacks. As an example, with every custom software release came the need for individuals to track, understand, and support the software. Consequently, custom software increased the costs for the software vendor as well as the software owner, and led to a general lack of standardization that hampered efficient production, delivery, and support of the software. Accordingly, a need existed for an automated data processing method that is interactive and will allow a user to develop or change the system operation on a real-time basis.

BRIEF SUMMARY

Methods and systems consistent with the invention provide a flexible, modifiable, and sophisticated customer profile generation method using and evaluation against administrator dynamic rules for processing. The dynamic build process may apply a wide range of attributes relating to the object of the profile. As a result, the software owner/administrator may develop sophisticated profile instances using their own input data, without intervention from a software vendor.

In one embodiment, a configurable business process adapted to be created from a user interface includes defining flow tasks that identify value objects and obtaining the value objects used by the flow tasks. The value objects are evaluated using evaluation rules to produce a result. The result is used to generate instructions to a system user relating to the value objects.

In another embodiment of the invention, a configurable business process includes providing a business flow engine accessible to a system user through a user interface. An adapter configuration file is defined maps components, methods, arguments, and return values using an XML engine. Component APIs and an evaluation rules database are provided and a business flow configuration file is defined that contains selected component APIs to be executed. The component APIs are executed to perform a user-defined operation and instructions to the system user are provided based upon an outcome of the user-defined operation.

In yet another embodiment of the invention, a method for building and using a profile instance in real time by a system user includes defining an adapter configuration file that maps components, methods, arguments, and return values using an XML engine. Component APIs and an evaluation rules database are provided and a profile definition is created. Data for an object is provided and a business flow configuration file is defined that contains selected component APIs to be executed. The component APIs are executed to build a profile instance from the profile definition and the data for the object, and to evaluate the profile instance the using evaluation rules. Instructions are provide to the system user based on evaluation of the profile instance.

DETAILED DESCRIPTION

The present invention is intended for use with an enterprise system that provides customer care and billing business processes. Although the enterprise system is flexible and can address a variety of applications, the instant system ideally supports lines of business, such as cable television, direct home satellite services, telephony, utilities, internet services, and the like. Within this context, the portion of the enterprise system to which the instant invention is directed provides a wide variety of services, including customer management, service provider management, account financial management, billing, and the like.

The enterprise system is designed to provide services to a variety of users within and associated with a business enterprise. The users include the system administrator, customers, system operator, sales agents or retailers, suppliers, network operators, and the like.

In accordance with an embodiment of the invention, a user can configure a business process to be performed by the enterprise system through a user interface. The business process can be customized, in real time by the system user, such as an administrator, to suit the needs of the user for the user's particular industry, market requirements, business practices, and the like. Further, the user can add capability to its version of the enterprise system as its needs change over time.

Figure 1:
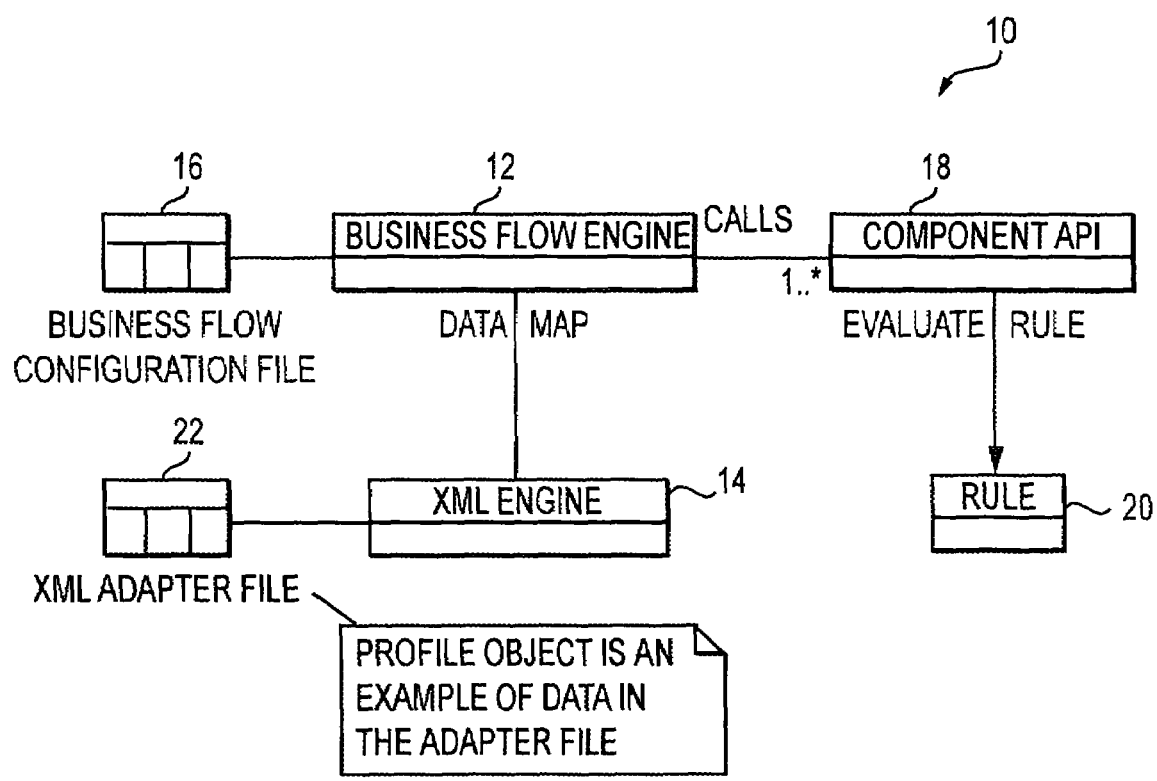
FIG. 1 illustrates a data model for a user configurable business process in accordance with an embodiment of the invention.

FIG. 1 illustrates a data model 10 for a user configurable business process in accordance with an embodiment of the invention. Data model 10 includes a business flow engine 12 and an XML engine 14. Business flow engine 12 operates with executable flow configuration files created and stored in a flow configuration program structure 16. Business flow engine 12 accesses task components in a component application-programming-interface ("API") file 18, which is linked to a rules database 20. XML engine 14 operates with executable adapter files created and stored an adapter program structure 22.

A system user can define the flow configuration file to execute a predetermined series of tasks in order to carry out a particular business process. Business flow engine 12 manages the business flow configuration file, which defines the component APIs that are to be executed together as a single flow. The task components identify methods in adapter program structure 22, which returns value objects though XML engine 14. One such value object is a profile. In the exemplary embodiment described herein, the user evaluates profile instances for customers against evaluation rules to determine whether or not the customer is eligible to receive a particular product or service. Those skilled in the art will recognize the system for executing the configurable business process described herein can be used for a variety of business methods, including profile evaluations for other objects, such as retailers, and the like.

In general, the XML APIs provide a means for third-party systems to utilize the enterprise system to execute business transactions. The XML APIs provide a subset of all APIs available to system users for a given component. XML/HTTP is the preferred interface to the components because it supports business-to-business and business-to-customer services. Also, this interface provides a common language medium for different user systems that individually employ a variety of programming languages.

The XML APIs map to a component's corresponding Java public API. For example, identifying a particular sales agent, assembling orders, and evaluating customer profiles represent single-step transactions that can be carried out by the business flow configuration files. Once control is passed to a Java API, the API can call many other API's to perform the desired task. In the context of the present invention, a public API is an API that can be called by systems that are external to the business enterprise system. In the context of customer profile evaluations, the XML APIs follow specific protocols and conventions. For example, data conventions, request and layer flows, and delivery and messaging all follow predefined protocols. Table I below shows examples of data conventions used by the XML APIs.

TABLE I

Data Conventions

| Data to Represent | Representation Convention |
| --- | --- |
| Boolean/Boolean | 0, 1, true, false (as allowed by XML Schema boolean data type). |
| Common codes | CommonCodeId |
| Currency | Requires two attributes - Currency type in ISO 4217 format and Amount. For example: <Price currency_type="USD"> 12.35<Price> |
| Date | ISO 8601 format: YYYY-MM-DD For example: 2004-01-26 |
| DateTime (Complete date and time in hours, minutes, and seconds) | Always in ISO 8601 format where T represents time and Z represent zero meridian. |
| DateTime (Complete date and time in hours, minutes, seconds, and decimal fraction of a second) | YYYY-MM-DDThH:mm:ss.sZ For example: 2004-01-26T19:20:30.45Z |
| Empty string | Element with no content, attribute = "" |
| Empty container, such as a collection, map, or table | Element with tag name identical to collection name, no content. |
| Locale | ISO639 and ISO 3166. For example, en-US. |
| NULL value | Element or attribute not present in XML. |

XML engine 14 organizes requests and layer flows into a hierarchy that is illustrated in below in Table II.

TABLE II

XML API Request And Layer Flows

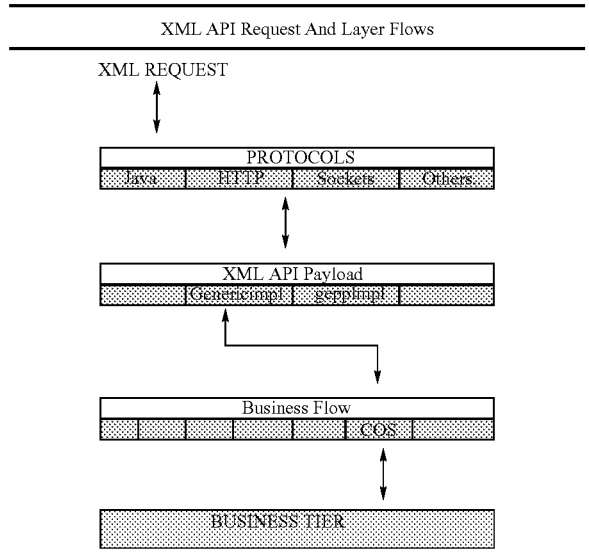

In a preferred embodiment, the XML APIs follow an HTTP protocol to receive the incoming XML document, convert it to a String object, and passes it on to the Payload. The delivery protocol also extracts the resulting XML document from the Payload and returns it to the user. The preferred messaging protocol for exchanging information is Simple Object Access Protocol (SOAP). The SOAP defines the header and body of all requests and responses.

The XML API Payload receives the incoming XML document, parses out the name of the business service being invoked, for example, "identify sales agent," "get eligible products," and the like, identifies a specific implementation object for the particular business service, and transfers the document to the correct processing location. The implementation object parses the XML document into the appropriate JAVA objects and performs any required validation needed for the business service. The implementation object also executes the business flow associated with the business service and builds the resulting output XML document, or if necessary, an error document. A diagram of XML document processing and data transformation for input and output in accordance with an embodiment of the invention is shown below in Table III.

TABLE III

Payload Data Flow

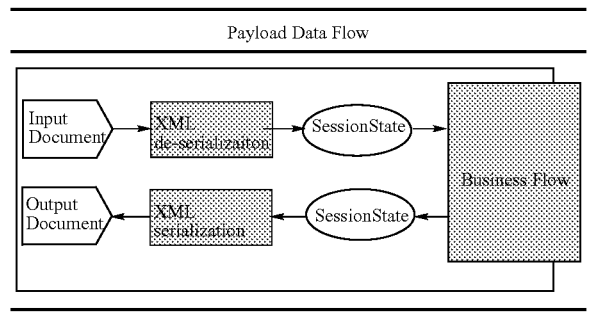

Business flow engine 12 determines how the associated business services map into a particular Java API. The associated business flow configuration file 16 and adapter file 22 determine the mapping, as described above.

A user accesses the XML APIs by constructing an appropriate SOAP XML document and posting the document to the appropriate URL across the HTTP. Table IV below shows the elements and attributes contained in the SOAP request.

TABLE IV

SOAP Request Header Attributes

| SOAP Header Elements/Attributes | Description |
| --- | --- |
| Request name | (required) The name of the XML API. |
| UsernameToken | (required) Contains both the Username and the Password. The Username attribute is the Concorde user name. The Password attribute is the Concorde password and is encrypted. |
| Retailer ID | (required) The Retailer ID tied to the Username for purposes of authentication on each XML API call. |
| ContextInfo | Provides a way for the end user to pass along pieces of information into Concorde. See "ContextInfo" on page 25 for further information about ContextInfo. |

When the XML API framework parses the SOAP header, it looks for the element ContextInfo. The XML API framework uses this element to create a HashMap. Every attribute and value of the element is added to the HashMap as a key/value. After the framework creates the HashMap, it places the HashMap in the session state object along with the remaining header information and transfers the HashMap to Business flow engine 12. Since the session state contains the ContextInfo HashMap, the business flow can be configured to send the HashMap as an argument to a task, step, or method as an argument. Within the present invention, the contents of the HashMap can be modified by the task, step, or method and returns the contents to its place of origin. The XML API framework extracts all the keys and values and transforms them into attributes and values in the SOAP response header ContexInfo object.

The XML APIs can be employed for a wide variety of tasks within the enterprise system. One example of the a business transaction carried facilitated by XML APIs within the business enterprise system is the evaluation of profiles to determine eligibility of an entity for various services and the generation of information to a system user to carry out a particular action. For example, the enterprise system uses profiles to control processing-based characteristics of the users and other entities, such as customers, retailers, accounts, targets, and the like. As used herein, customers are end users of the services provided by an operator of the enterprise system. Retailers are providers of the products sold by the operator, accounts are the business record files of customers and retailers, and targets are devices or device components that send and receive electronic signals.

Profiles are convenience classes within the enterprise system that are used to characterize one or more enterprise classes. Profiles are constructed from enterprise class attributes. There are several types of profiles within the enterprise system. For example, profiles can be created for various classes, such as customer, customer account, target, retailer, and the like. The profiles are composed of a subset of attributes from the enterprise classes. For example, a customer profile may contain attributes, such as identity, address, credit rating, and the like. The customer account may contain various attributes, such as balance, status, account type, hardware owned, current product portfolio, related accounts, and the like. A retailer profile, for example, may include retailer identification, number of accounts serviced, account identifiers, customer identifiers, target identifiers, and the like.

In accordance with one embodiment of the invention, during the custom configuration of the business process, profiles are passed to different software components by a user configurable business flow engine. The business flow engine manages the steps within a transaction. For example, an administrator uses business flow to set the specific steps and their sequence to process the creation of a new account. The business flow can be customized to add steps and remove steps as desired by the user to adapt the business process, for example, to a particular line of business, or particular customer or retailer requirements, and the like.

The business flow passes the profile information to a software component where rules are applied to evaluate profile components against the rules for the purpose of generating user instructions. Each application programming interface is enabled with business flow software that allows addition and subtraction of processing steps in the business flow. Further, an XML engine is provided that allows changing of the data elements passed in the programming interfaces without the need to change software code. As will subsequently be described, the XML engine also passes value objects through the interfaces to the various system components. In a preferred embodiment of the invention, the business flow and XML engines is deployed in Java/J2EE.

The class definitions within a profile are used by the enterprise system to create processing rules. Dynamic rules are provided in which the class attributes are used as arguments and the values of the attributes are used as constraints within the rules. The values for a particular customer or retailer, for example, are used by the enterprise system to evaluate the rules. Thus, the inventive method enables a user to modify the data processing system in real-time without the need to re-program the operating software. Further, once a profile is established, it can be changed to accommodate various needs. For example, attributes can be added or deleted from the profile.

A profile definition contains information needed to build an instance of a profile. The profile definition is used as an input to define rules. There may be multiple profile definitions in the enterprise system established for different entities (examples include customer and retailer profiles). Profile definitions constrain the definition of dynamic rules by establishing a set of classes, attributes, and valid values to choose from when setting up rules. In accordance with one embodiment of the invention, a profile definition contains at least one profile class database (the source of profile information) plus any required attributes from the profile class database and their valid values.

Figure 2:
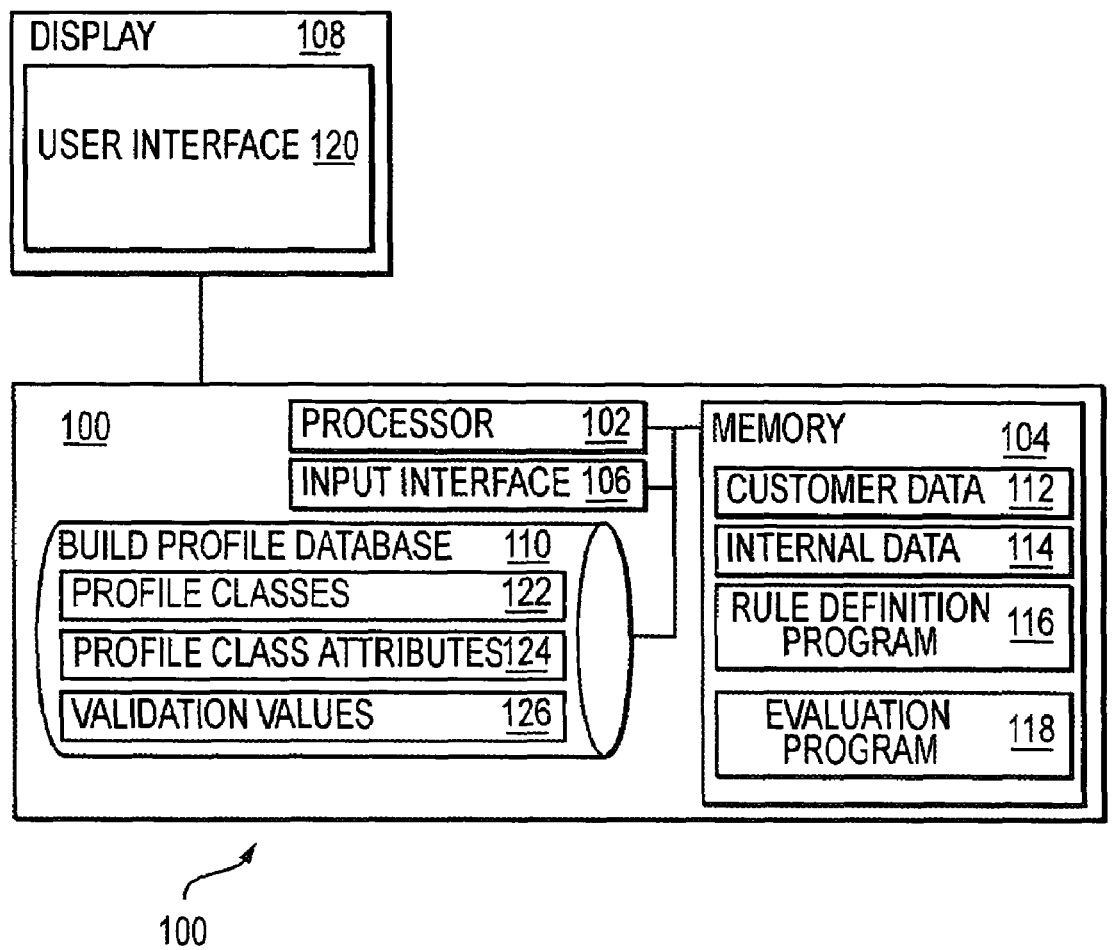
FIG. 2 illustrates a data processing system that incorporates a dynamic rules engine for building a profile definition.

FIG. 2 shows a data processing system 100 accessible by a system user to configure a business process in accordance with the invention. Data processing system 100 includes a processor 102, a memory 104, and an input interface 106. Data processing system 100 further includes a display 108 and a build profile database 110. Data processing system 100 executes flow configuration files 16 and adapter files 22 using business flow engine 12 and XML engine 14 as described in the data model illustrated in FIG. 1.

As described above, the invention will be set forth in the context of applying dynamic rules against information data bases to evaluate a profile instance and provide user instructions. Memory 104 temporarily stores data, for example customer data 112, internal data 114, and programs, for example, a rule definition program 116 and evaluation program 118. A user interface 120 enables access to business flow engine 12 that enables an operator to build profiles for application to the customer data 112. The build profile database 110 implements a data model for the rules engine, including, as examples, profile classes 122, profile class attributes 124, and validation values 126.

The particular implementation described herein is exemplary in nature. For example, although selected aspects, features, or components of the implementations are depicted as being stored in the memory 104 and profile database 110, all or part of systems and methods consistent with the present invention may be stored on or read from other machine-readable media, for example, secondary storage devices such as hard disks, floppy disks, and CD-ROMs; a signal received from a network; or other forms of machine readable memory either currently known or later developed.

Furthermore, the specific components of the data processing system 100, such as methods, systems, and articles of manufacture consistent with the profile build process may include additional components or different components. For example, the processor 102 may be a microprocessor, microcontroller, application specific integrated circuit (ASIC), discrete logic, or a combination of other types of circuits acting as explained below. Similarly, the memory 104 may be DRAM, SRAM, Flash or any other type of memory. Build profile database 110 may be separately stored and managed, split into multiple databases, and generally logically and physically organized in many different ways. Furthermore, dynamic rules database 110 may more generally represent data files searchable using techniques other than relational database queries. Also, the individual programs may be parts of a single program, separate programs, program libraries, or distributed across several memories, processors, and the like.

Figure 3:
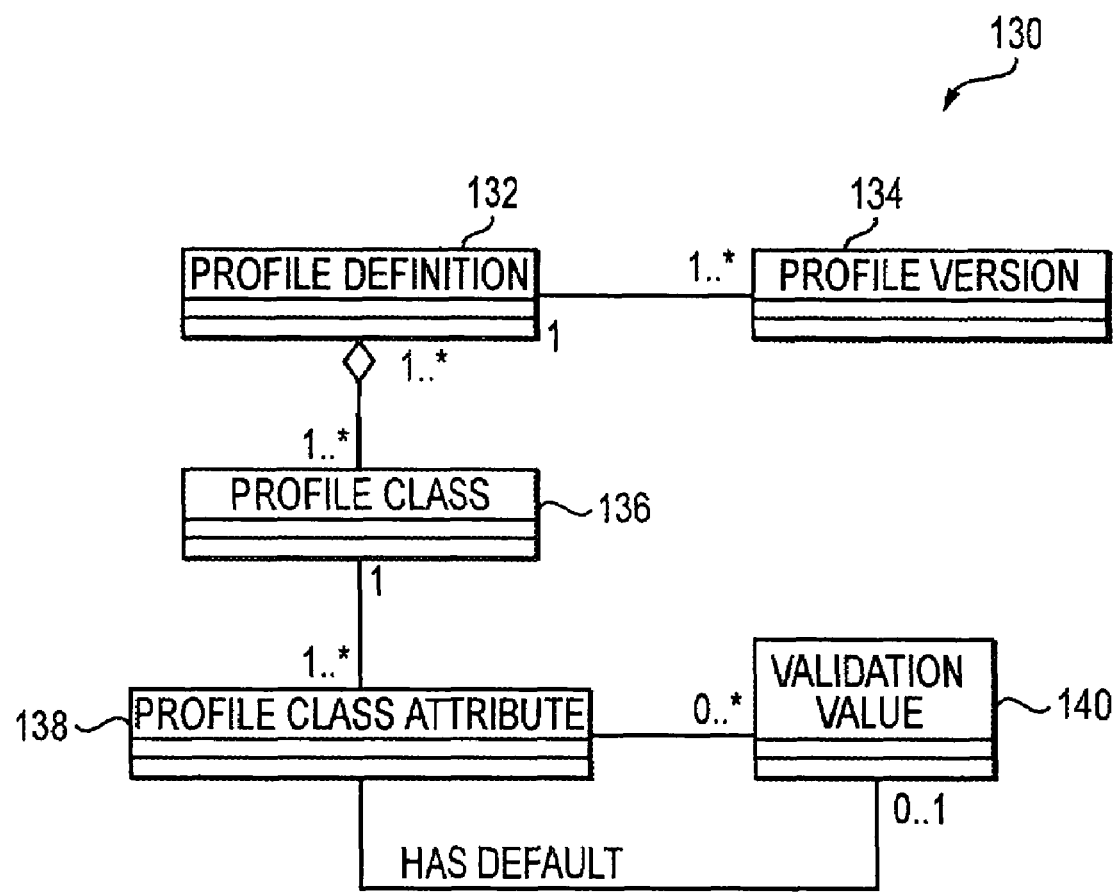
FIG. 3 illustrates a data model for a profile definition build process in accordance with an embodiment of the invention.

FIG. 3 illustrates a data model 130 for a profile definition build process in accordance with an embodiment of the invention. Data model 130 produces a profile definition class database 132 associated with a profile version class 134. Profile version class 134 associates the profile definition with particular classes, such as a customer, retailer, sales agent, and the like. Data model 130 includes profile classes database 136, which in turn, includes profile class attributes database 138. Each profile class attribute is associated with a validation value from validation value database 140.

Profile classes database 136 is contained within profile class database 122 of build profile database 110. The number of available profile classes is limited to the contents of the database and additions to the number of profile changes may, in some circumstances, require that the programming code be changed.

In the case of a customer profile definition, the profile can include the following classes: customer, account, contact points, customer products, equipment, and addressable targets. In accordance with an embodiment of the invention, each class includes attributes which can be selected by the user during the profile definition process. During the profile definition process, the user selects profile class attributes from attributes data base 124 for each class through user interface 120. A portion of the attributes for each class have validation values. The validation values are contained in validation values database 126. The validation values provide range limits for certain attributes, provide identifiers, define acceptable values for certain attributes, and the like.

An exemplary customer profile definition is shown in Table V below.

TABLE V

Customer Profile Definition

| Source Class | Attribute | Customer Role | Valid Values |
|---|---|---|---|
| Customer | Customer Credit Rating | Payer | As determined from a credit agency. Numeric 0 to 100; 0-50 (Low), 51-80 (Medium), 81-100 (High) |
| Account | Account Classification | Payer | Valid Account Classification by account/retailer<br>☛ Regular<br>☛ VIP<br>☛ Commercial - Bar |
| Account | Account Location - Postal Code | Consumer | Postal code by account/retailer |
| Account | Account Balance | Payer | Current account balance by account/retailer |
| Account | Account Past Due | Payer | Current account past due balance by account/retailer |
| Account | Account Current Product's | Consumer | Valid list of products on customer account by account/retailer |
| Account | Account Equipment | Consumer | List of equipment at consumers service address |

The customer profile definition includes classes for customer and account and attributes for each class. The profile definition also identifies the role of the customer and account classes as payer, one who pays for products and services, or consumer, one who consumes the products and services, but may not pay for them. Validation values are provided for the customer rating attribute to specify the credit rating depending upon a numeric rating. Similarly, values are also provided for type of account classification. Other values are provided for account financial analysis, account balances, and past due amounts. In addition, to range and qualification values, the validation values also include lists of products and equipment associated with an account.

Using the method illustrated in the data model of FIG. 3, similar profile definitions to the profile definition shown in Table V can also be generated for another object, such as retailers, suppliers, sales agents, and the like. As noted in Table V, valid values include account attributes that can apply to a customer or a retailer.

Figure 4:
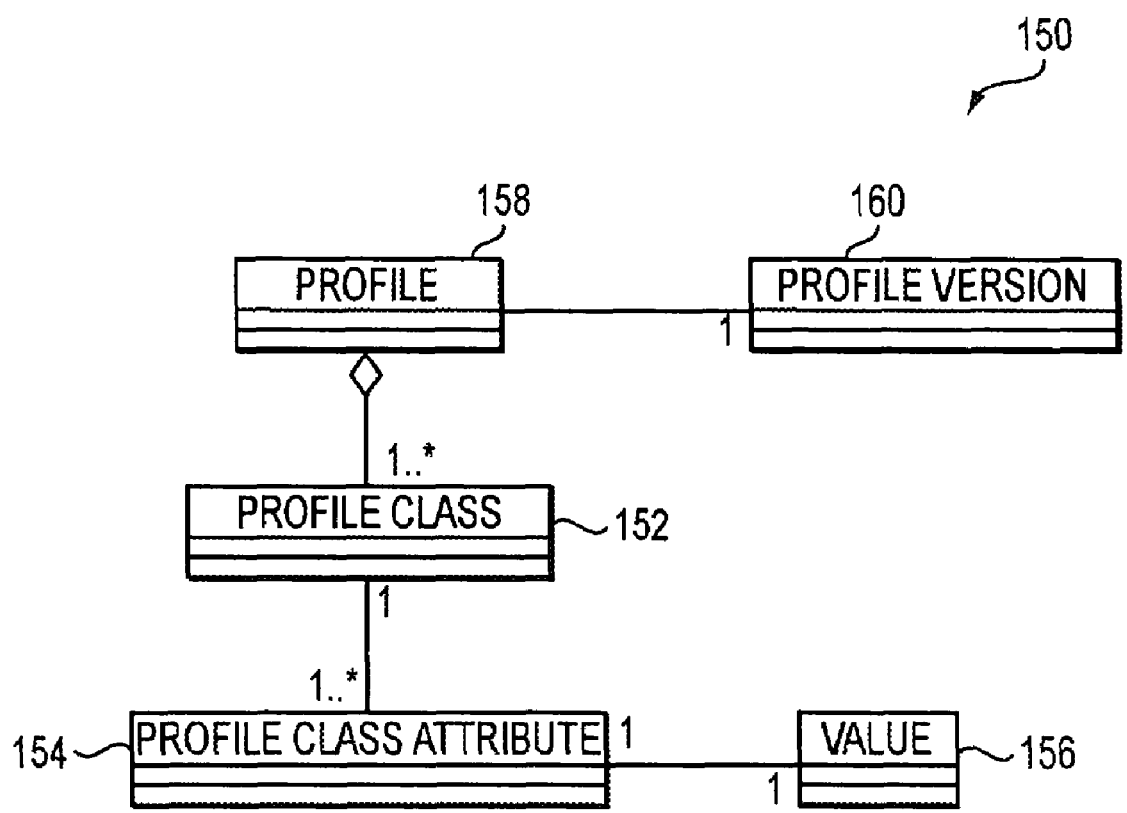
FIG. 4 illustrates a data model for a profile instance in accordance with an embodiment of the invention.

The profile definition can be used to establish a profile instance for a particular customer, retailer, or other object within the enterprise system. FIG. 4 illustrates a data model 150 for a profile instance in accordance with an embodiment of the invention. Within data model 150, a profile class database 152 and a profile attribute class database 154 are associated as defined by profile definition data model 130. A value class 156 contains a specific value for the particular object of the profile instance, for example, a customer or a retailer.

Data model 150 produces a profile instance 158 that is associated with a profile version class 160. An example of a customer profile produced by data model 150 is shown below in Table VI.

TABLE VI

Customer Profile

| Attribute | Values |
| --- | --- |
| Customer Credit Rating | Medium |
| Account Classification | Regular |
| Account Location - Postal Code | 28901 |
| Account Balance | $50 |
| Account Past Due | $0 |
| Account Product History | Null |
| Account Equipment | DSTB 2000 |

The customer profile includes several attributes and associated values. As set forth in Table II, the profile definition includes identification information, such as postal zip code, range values, such as credit rating and account classification, and financial information, such as account balances, and the type of equipment in use by the customer.

As described above, profile instances, such as the profile instance shown in Table VI, are developed through the application of dynamic rules. Dynamic rules operate to constrain the relationships within the profile data model. For example, a product eligibility rule defines product eligibility for a particular customer depending upon customer qualifications. Further, a product-price eligibility rule defines customer qualifications necessary for the customer to be charged a particular price for the product.

In accordance with an embodiment of the invention, a particular rule is set up using a visual editor, such as display 108 and user interface 120. In general, user interface 120 may be implemented in many formats. For example, user interface 120 may employ radio buttons, drop down lists, selection boxes, text entry fields, scroll bars, drop down menus, selection buttons, toggle buttons, or any other type of user interface element for implementing the dynamic rule processing technique of the present invention.

An example of a user definable rule for product eligibility is set forth as follows:

Dynamic Rule

If Customer Credit Rating>Low and Postal Code>28*
Then Customer is eligible=True In the dynamic rule shown above, the class attributes "customer credit rating" and "postal code" are used as arguments, and the values "low" and "28*" are used as constraints. A user, such as an administrator, selects the attributes customer credit rating and postal code from lists available within profile definition data model 130. The user enters the values "Low" and "28*" and a system editor, which can be contained in build profile data base 110, provides the remaining text and user prompts.

Accordingly, product eligibility can be defined by an administrator based on a customer credit rating qualification and a particular characteristic, such as customer geographical location. Those skilled in the art will appreciate that many different rules similar to the rule illustrated above can be created for the numerous attributes associated with customers, retailers, suppliers, sales agents, and the like.

Those skilled in the art will recognize that the dynamic rule set forth above is one example of many different relationships that can be established in accordance with the inventive method. For example, rules can be established for numerous attributes with a given class. The rules are designed to be used by a user of the enterprise system and are configured for a particular line of business.

Figure 5:
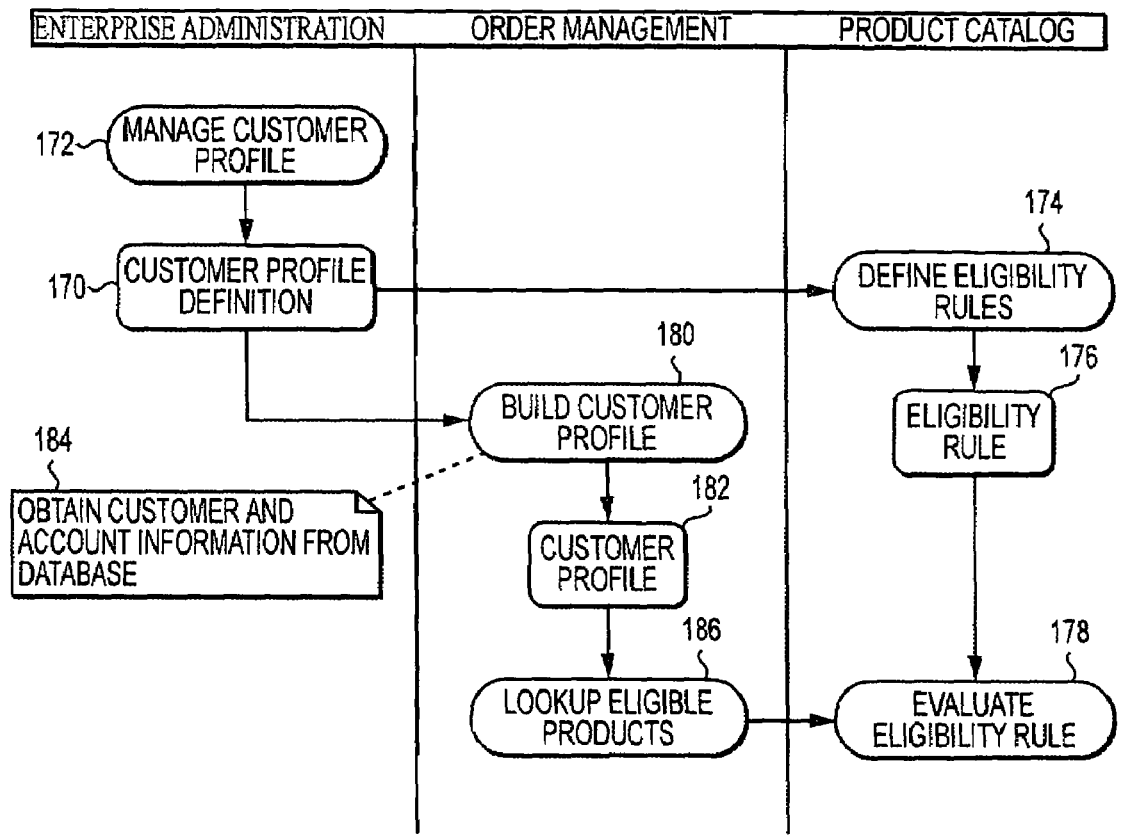
FIG. 5 illustrates a flow diagram of a method for maintaining and using a profile definition employing dynamic rules processing in accordance with an embodiment of the invention.

An exemplary method for maintaining and using a customer profile employing dynamic rules processing is illustrated in FIG. 5. The illustrated method can be employed by a user, such as an administrator, a customer service representative, and the like, to create and maintain a customer profile definition, such as described above.

In accordance with the illustrated embodiment, a customer profile definition 170 is created and maintained by a manage customer profile application 172. Eligibility rules are employed by a define eligibility rules application 174, which provides an eligibility rule 176, such as the rule illustrated above. Eligibility rules application 174 defines eligibility rules for numerous attributes, such as products, prices, and discounts, and the like. The rules application can be administered, for example, by rule definition program 116.

Once eligibility rule 176 is established, it can be evaluated by evaluate eligibility rule application 178. Evaluation application 178 performs several kinds of evaluations using rules from rules definition application 174. For example, application 174 will evaluate proposed products for a customer and provide a list of acceptable products that the customer is eligible to purchase. Evaluation application 174 can be administered, for example, by evaluation program 118.

When an order is received to create a new customer profile, build customer profile application 180 is initiated. Customer profile application 180 uses customer profile definition 170 to build a customer profile 182 in accordance with the process described above. Customer profile application 180 accesses files 184 that contain varies customer information, such as financial information and contract information as needed, to construct customer profile 182.

As customer profile 182 is being created, a lookup eligible products application 186 is initiated to provide a list of products and services for customer profile 182. The potential products are evaluated by products application 186 using eligibility rule application 178. Product application 186 returns eligible products to customer profile 182.

Figure 6:
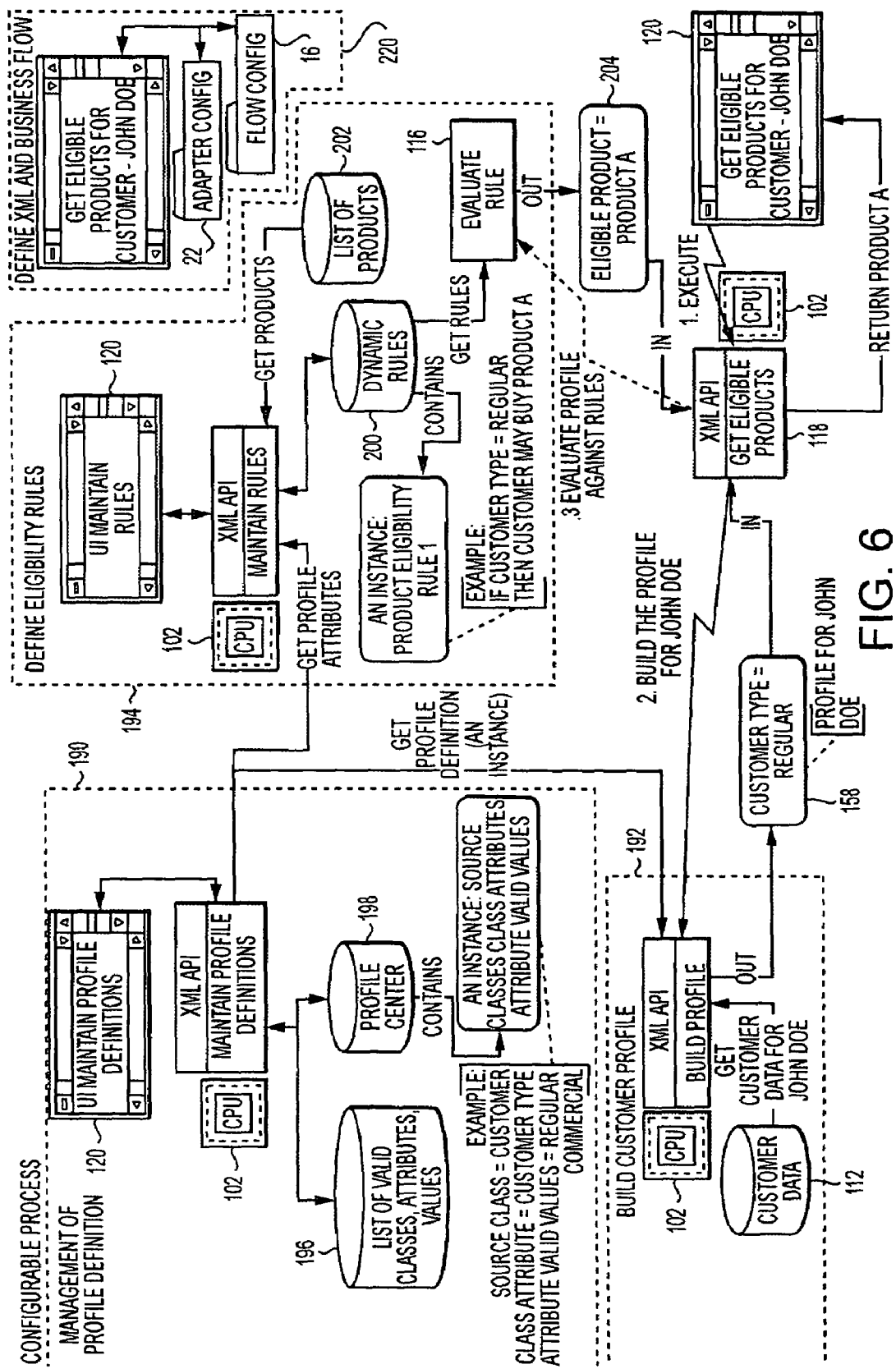
FIG. 6 is a schematic diagram of a system and method in accordance with an embodiment of the invention for profile generation and evaluation within an enterprise system.

Shown in FIG. 6 is a schematic diagram of a system and method in accordance with an embodiment of the invention for profile generation and evaluation within an enterprise system. The system includes three subsystems, a profile definition subsystem 190, a profile build subsystem 192, and a rules definition subsystem 194.

Referring to FIGS. 2 and 6, profile definition subsystem 190 includes data structure 196 that contains profile classes database 122, profile class attributes database 124, and validation values database 126. Profile definitions are maintained in a profile data structure 198. Processor 102 acts on instructions provided by a system user through user interface 120 to generates profile definition 132.

Referring to FIGS. 2, 3, and 6 profile build subsystem 192 includes a customer database 112. Upon instructions from user interface 120, processor 120 acquires data from customer database 112 and a profile definition from profile definition subsystem 190 and generates profile instance 158.

Referring to FIGS. 2 and 6, rules definition subsystem 194 includes dynamic rules database 200 and product catalog 202. Upon instructions from user interface 120, processor 102 acquires profile attributes from subsystem 190, a set of rules from rules database 200, and a product list from product catalog 202. Rule definition program 116 is executed to provide a list of eligible products 204 based on the acquired rules and the profile attributes. Evaluation program is executed to determine which products are eligible for the customer.

Those skilled in the art will recognize that system and method of the invention can be applied to a wide variety of objects, such as suppliers, retailers, sales agents, and the like. Accordingly, the foregoing description set forth in the context of a customer and product eligibility is merely illustrative of one embodiment of the invention. For example, database 112 can contain credit rating information and rules database 200 can contain rules that determine the extension of credit to a customer, how to treat late payment of a bill, and the like. Further, database 112 can contain data for a retailer, sales agent, supplier, and the like, and rules database 200 can contain rules that apply to a rating for retailers that sell products and services for the enterprise system.

As shown in FIG. 6, each of the hardware processing components includes an XML applications interface that enables profile data to be passed between the system components. As described above, the process of passing profiles and rule evaluations between the applications interface is preferable carried out by business flow engine 12. Business flow engine 12 accesses XML configuration files that are resident on data processing system 100 and enables a system user to change the business process configuration, such that the change takes effect in real time, but without affecting flows that are in process.

As described above, the business flow engine employs flow configuration files 16 for task definition and adapter configuration files 22 for mapping. As will subsequently be described, adapter configuration files 22 contain AdapterConfiguration code that defines the components, the methods on those components, and the locations in the session state containing the arguments for those methods and where to store the results. The AdapterConfiguration includes descriptions of components, methods, arguments, and return values, and the content to session containers. The adapter code also defines mapping between the values in the session containers and the arguments and return values. The AdapterConfiguration is organized into three sections as shown below.

```
<AdapterConfig>
    <ComponentList>
    <SessionList>
    <ContextList>
</AdapterConfig>
```

The component lists include component identification, method identification and argument description as shown below. An example of the AdapterConfiguration code to get eligible products and prices (GEPP) is shown below.

```
<Component xmi.id="PC_GEPP"
    jndi_home="InterfaceMgmt.InterfaceMgmtHome">
<!--
Method xmi.id="PC_getEligibleProductsAndPrices"
    name="getEligibleProductsAndPrices">
<Argument xmi.id="PC_searchCriteriaVO"
    name="searchCriteriaVO"
    type="com.dstsystems.concorde.business.valueObject.productCatalog.Retailer
        O" />
<Argument xmi.id="PC_profilesVO"
    name="profilesVO"
    type="com.dstsystems.concorde.business.valueObject.productCatalog.Profiles"
    />
<Return xmi.id="PC_lstToReturn"
    name="lstToReturn" type="java.util.ArrayList"/>
</Method>
</Component>
```

As shown above, the component, method, argument, and return each have unique identifiers. The argument code also includes name and argument type identifiers. The session and context lists have a structure similar to the component list shown above.

The method executed in the exemplary code illustrated above executes a process component "getEligibleProductsAndPrices," which is illustrated in FIG. 6 as step 118. Business flow engine 12 calls component API 18, which identifies a dynamic rule similar to that shown above obtains a rule executes rules database 20. In this case, the rule relates to product eligibility as shown in FIG. 6. The AdapterConfiguration code also maps arguments to obtain a profile instance, "profile VO," return values shown as step 158 in FIG. 6, and eligible products "search criteria VO," shown as step 204 in FIG. 6.

Flow configuration files 16 include FlowConfiguration code that defines the flows, for example, the components and methods that are to be executed and the order of execution. This configuration is preferable kept simple so that a business analyst will be able to easily maintain this file. An example of the XML flow configuration code for GEPP is shown below.

```
<Flow name="GEPP">
<Task component="PC_GEPP"
    method="PC_getElgibleProductsAndPrices" />
</Flow>
```

The FlowConfiguration code includes the same unique flow name, component and method identifiers as shown above in the AdapterConfiguration code. The flow name is used in the business flow interface to identify the flow to be executed. Those skilled in the art will appreciate that additional flows can be nested within the task component shown above, where each nested flow can include a different method. The nested flows define a flow that executes other flows as tasks.

Business flow engine 12 is configured to accept input from the user interfaces for the logging of flows and tasks, where the log includes the user name, beginning and end identifiers of each flow and task, a timestamp, and a flow/task name. Further, a method on a subsystem may be called from multiple business flows, where each business flow may use a different source in the session state to supply the arguments for the methods. Business flow engine 12 also allows a system user to open value objects in the session state to retrieve arguments by calling getter methods and to store results by calling putter methods. In one embodiment, a business flow executes as a single J2EE transaction, including any nested business flows.

Thus, it is apparent that there has been described in accordance with the invention, a method for profile generation using dynamic rules processing that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, the order of processing described above can be changed and databases can be established in different order. It is therefore intended to include within the invention all such variations and modifications that fall within the scope of the appended claims and equivalents thereof.

The invention claimed is:

1. A machine readable storage medium for configuring a user configurable business process by a system user of an enterprise system using a user interface, the machine readable medium comprising logic responsive to user interactions with the user interface to:
    define flow tasks that identify value objects;
    obtain the value objects used by the flow tasks;
    evaluate the value objects using evaluation rules to produce a result; and
    use the result to generate instructions to the system user relating to the value objects, wherein the system user is a customer that is offered services and products provided by an operator of the enterprise system and the customer:
        defines the business flow configuration file;
        defines context information the customer desires to use to further customize the configurable business process; and
        evaluates the profile instance to obtain a version of the enterprise system that is customized to the customer.

2. The machine readable storage medium of claim 1, wherein the logic further comprises responsiveness to user interactions with the user interface to construct a flow configuration file that identifies task components and executable methods.

3. The machine readable storage medium of claim 1, wherein the logic further comprises responsiveness to user interactions with the user interface to:
    provide an adapter configuration file identifying the value objects and
    execute the adapter configuration file to return result values for the value objects.

4. The machine readable storage medium of claim 3, wherein the value objects comprise profile instances.

5. The machine readable storage medium of claim 4, wherein the logic further comprises responsiveness to user interactions with the user interface to analyze the profile instances with dynamic rules, wherein the result values comprises the result of analyzing the profile instances with the dynamic rules.

6. The machine readable storage medium of claim 1, the logic further responsive to user interactions with the user interface to provide component APIs linked to a rules database, and execute a business flow program to evaluate the value objects.

7. The machine readable storage medium of claim 6, wherein the rules database comprises user defined evaluation rules including arguments and restraints.

8. The machine readable storage medium of claim 1, wherein the logic further comprises responsiveness to cause the user interface to display the instructions to a system user relating to the value objects on a user interface device.

9. A computer implemented method for configuring a configurable business process, the method comprising:
    providing a business flow engine accessible to a system user of an enterprise system through a user interface;
    defining an adapter configuration file that maps components, methods, arguments, and return values using an XML engine;
    providing component APIs and an evaluation rules database;
    defining a business flow configuration file that contains selected component APIs to be executed, including context information the system user desires to use to further customize the configurable business process;
    executing the component APIs to perform a user-defined operation; and
    providing instructions to the system user based upon an outcome of the user-defined operation, wherein the system user is a customer that is offered services and products provided by an operator of the enterprise system and the customer defines the business flow configuration file to obtain a version of the enterprise system that is customized to the customer.

10. The method of claim 9, wherein the user-defined operation comprises building a profile instance and evaluating the profile instance using evaluation rules from the evaluation rules database.

11. The method of claim 10, wherein the profile instance comprises a customer profile instance obtained from a profile definition that includes customer information and account information relating to the customer, and validation values that relate to the customer information and the account information.

12. The method of claim 10, wherein the profile instance comprises a retailer profile instance obtained from a profile definition that includes retailer information and account information relating to the retailer, and validation values that relate to the retailer information and the account information.

13. The method of claim 9, wherein the component APIs operate on a rule from the evaluation rules database.

14. A method for building and using a profile instance in real time by a system user of an enterprise system, the method comprising:
    offering services and products to a customer by an operator of the enterprise system;
    defining an adapter configuration file that maps components, methods, arguments, and return values using an XML engine;
    providing component APIs and an evaluation rules database comprising evaluation rules;
    creating a profile definition;
    providing data for an object;
    defining a business flow configuration file that contains selected component APIs to be executed;
    executing the component APIs to build a profile instance from the profile definition and the data for the object, and to evaluate the profile instance using the evaluation rules; and
    providing instructions to the system user based on evaluation of the profile instance, wherein the system user is the customer and the customer:

defines the business flow configuration file; and evaluates the profile instance to obtain a version of the enterprise system that is customized to the customer.

15. The method of claim 14, wherein providing data for an object comprises providing data for a customer including a profile class containing customer information and account information relating to the customer, and wherein the evaluation rules relate to the customer information and the account information.

16. The method of claim 14, wherein providing data for an object comprises providing data for a retailer including a profile class containing retailer information and account information relating to the retailer, and wherein the evaluation rules relate to the retailer information and the account information.

17. The method of claim 14, wherein creating a profile definition comprises providing a user interface and using the user interface to associate profile classes, profile class attributes, and validation values.

18. The method of claim 14, wherein providing an evaluation rules database comprises:
providing a set of predetermined relationships;
providing one or more profile definition class attributes; and
using the one or more profile definition class attributes as arguments in the predetermined relationships.

19. The method of claim 14, wherein defining a business flow configuration file comprises defining a flow configuration file that identifies task components and executable methods.

20. The method of claim 19, wherein the executable methods are processed by the adapter configuration file.

21. The method of claim 19, wherein the profile instance is evaluated by an executable method.

* * * * *